(No Model.)
C. BAILEY.
TETHER.
No. 429,111. Patented June 3, 1890.
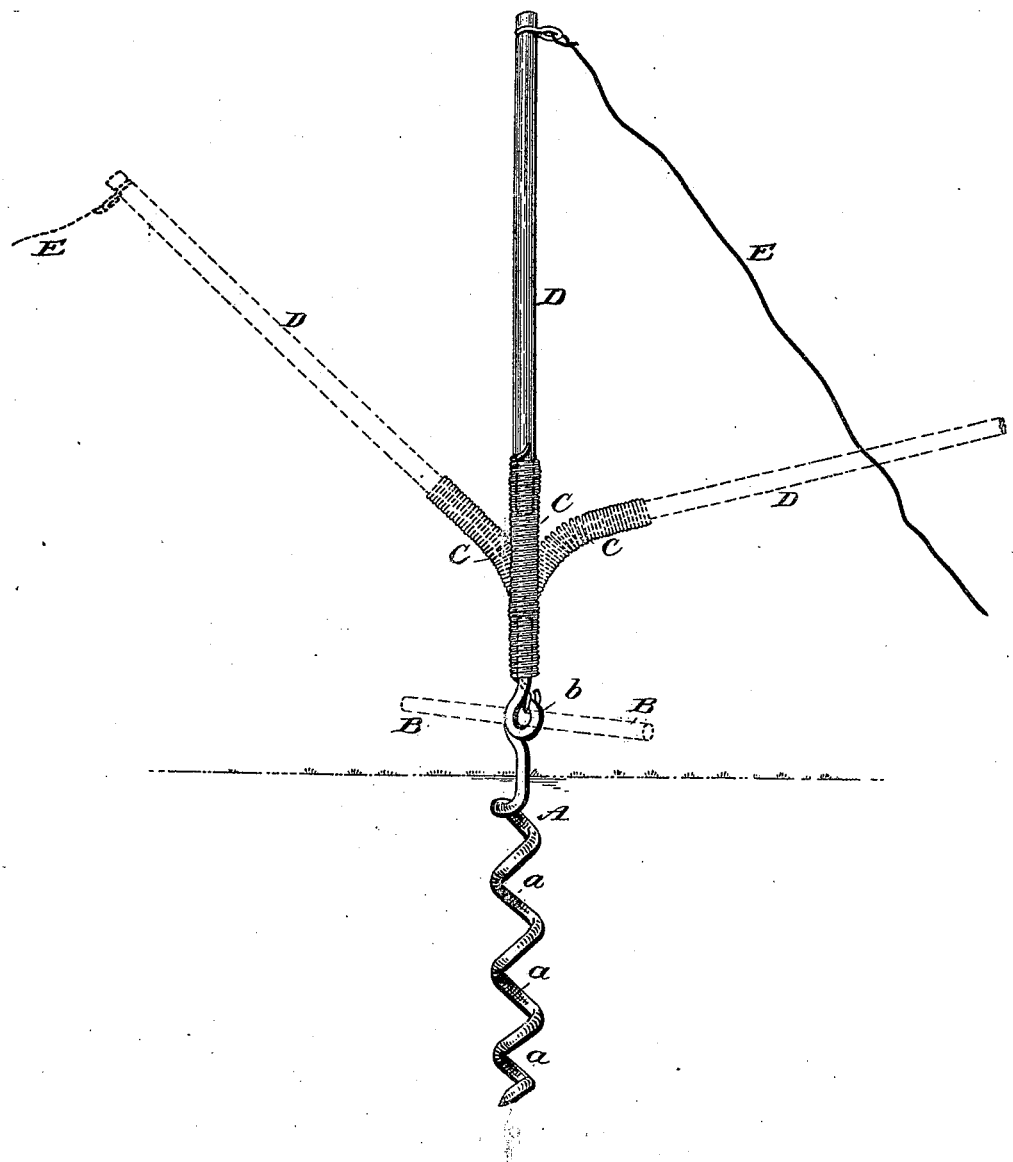
WITNESSES:
L. C. Hills
E. H. Bond
INVENTOR
Clem Bailey,
BY Chas. H. Fowler
ATTORNEY.

UNITED STATES PATENT OFFICE.

CLEM BAILEY, OF KINSTON, NORTH CAROLINA.

TETHER.

SPECIFICATION forming part of Letters Patent No. 429,111, dated June 3, 1890.

Application filed December 16, 1889. Serial No. 333,946. (No model.)

*To all whom it may concern:*

Be it known that I, CLEM BAILEY, a citizen of the United States, residing at Kinston, in the county of Lenoir and State of North Carolina, have invented certain new and useful Improvements in Animal-Tethers; and I do hereby declare that the following is a full, clear, and exact description of the same, reference being had to the annexed drawing, making a part of this specification, and to the letters of reference marked thereon.

This invention relates to certain new and useful improvements in animal-tethers; and it has for its object to provide a simple and cheap tether which shall allow the animal great freedom of motion.

The novelty resides in the peculiarities of construction of the tether and the combinations and arrangement of parts, all as more fully hereinafter described, shown in the drawing, and then particularly pointed out in the appended claim.

The invention is clearly illustrated in the accompanying drawing, which, with the letters of reference marked thereon, forms a part of this specification, and in which is illustrated a side elevation of my improved tether, showing in dotted lines the way in which the same may be moved around the center as a pivot.

Referring to the details of the drawing by letter, A designates a metallic rod formed into a screw shape, as shown at $a$, being formed above the part which is designed to be embedded in the ground with an eye $b$, through which a suitable rod or stick B may be passed for the purpose of screwing it into the ground and afterward removed. The shank of this screw portion extends upward a short distance above the said eye and has coiled around it one end of a spiral or coiled spring C, the end being held thereto by being wound around or otherwise secured to the eye, as shown in the drawing. The other end of this spring is coiled around and secured to the lower end of the rod or arm D, to the free end of which is attached a cord or rope or chain E, by which the animal is fastened.

In practice the tether is secured in the ground, as illustrated in the drawing, and the animal fastened to the rope or chain. The spring, having a portion between its ends unattached to either the shank or to the rod D, allows of great freedom of motion, turning on the shank of the screw portion as a pivot, as illustrated by dotted lines in the drawing. This is of great importance.

What I claim as new is—

An animal-tether consisting of the screw portion, the rod provided with means for attachment to the animal, and a coiled spring connected at one end to the screw portion and at the other to the rod, with an unattached portion between the points of attachment to the rod and screw portion, and an eye $b$ between the screw and connection of the spring, substantially as and for the purpose specified.

In testimony that I claim the above I have hereunto subscribed my name in the presence of two witnesses.

CLEM BAILEY.

Witnesses:
J. J. BIZZELL,
GEO. L. HODGES.